United States Patent
Bai et al.

(10) Patent No.: US 12,095,562 B2
(45) Date of Patent: Sep. 17, 2024

(54) INFORMATION TRANSMISSION METHOD AND USER EQUIPMENT

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 433 days.

(21) Appl. No.: 17/600,504

(22) PCT Filed: Mar. 30, 2020

(86) PCT No.: PCT/CN2020/082050
§ 371 (c)(1),
(2) Date: Sep. 30, 2021

(87) PCT Pub. No.: WO2020/200163
PCT Pub. Date: Oct. 8, 2020

(65) Prior Publication Data
US 2022/0166551 A1    May 26, 2022

(30) Foreign Application Priority Data

Apr. 2, 2019 (CN) .......................... 201910263377.9
Apr. 3, 2019 (CN) .......................... 201910267628.0
Nov. 7, 2019 (CN) .......................... 201911083619.2

(51) Int. Cl.
*H04W 4/00* (2018.01)
*H04L 1/08* (2006.01)
(Continued)

(52) U.S. Cl.
CPC .............. *H04L 1/08* (2013.01); *H04L 1/1642* (2013.01); *H04W 72/0446* (2013.01); *H04W 72/21* (2023.01); *H04W 72/563* (2023.01)

(58) Field of Classification Search
CPC ....... H04L 1/08; H04L 1/1642; H04L 1/1819; H04L 1/1864; H04L 1/1893; H04W 72/0446; H04W 72/21; H04W 72/563
See application file for complete search history.

(56) References Cited

U.S. PATENT DOCUMENTS 10,887,055 B2 *    1/2021  Wong .................. H04L 1/08
10,912,038 B2 *    2/2021  Peng ................... H04W 72/23
(Continued)

FOREIGN PATENT DOCUMENTS

CN    108292976 A      7/2018
WO    2019/032748 A1   2/2019

OTHER PUBLICATIONS

Nokia, Nokia Shanghai Bell, "Summary of offline discussion on the potential enhancements for PUSCH for NR URLLC", R1-1814326, 3GPP TSG RAN WG1 Meeting #95, Spokane, US, Nov. 12-16, 2018, all pages.
(Continued)

*Primary Examiner* — Stephen M D Agosta
(74) *Attorney, Agent, or Firm* — Ladas & Parry, LLP

(57) ABSTRACT

An information transmission method and a UE are provided. The information transmission method includes: obtaining configuration information for transmitting a Physical Uplink Shared Channel (PUSCH); obtaining respective Redundancy Versions (RVs) corresponding to at least two repeated/segmented transmissions of the PUSCH in accordance with lengths of the repeated/segmented transmissions of the PUSCH and the configuration information when the PUSCH is transmitted in the form of the repeated/segmented trans-
(Continued)

missions; and transmitting the PUSCH in accordance with the RVs.

8 Claims, 2 Drawing Sheets

(51) Int. Cl.
*H04L 1/1607* (2023.01)
*H04W 72/0446* (2023.01)
*H04W 72/21* (2023.01)
*H04W 72/563* (2023.01)

(56) References Cited

U.S. PATENT DOCUMENTS

| | | | | |
|---|---|---|---|---|
| 10,965,402 | B2* | 3/2021 | Zou | H04L 5/0044 |
| 11,394,504 | B2* | 7/2022 | Sun | H04L 1/08 |
| 2013/0242889 | A1* | 9/2013 | Khoryaev | H04L 1/1635 370/329 |
| 2018/0152271 | A1* | 5/2018 | You | H04L 1/08 |
| 2018/0375616 | A1 | 12/2018 | Beale et al. | |
| 2019/0053211 | A1* | 2/2019 | Ying | H04W 72/044 |
| 2019/0149365 | A1* | 5/2019 | Chatterjee | H04L 25/0226 370/329 |
| 2019/0261252 | A1* | 8/2019 | John Wilson | H04W 72/0446 |
| 2020/0145967 | A1* | 5/2020 | Park | H04W 72/23 |
| 2020/0221429 | A1* | 7/2020 | Li | H04L 5/0053 |
| 2020/0383095 | A1* | 12/2020 | Moon | H04L 5/001 |
| 2021/0058903 | A1* | 2/2021 | Takeda | H04W 72/04 |
| 2021/0084622 | A1* | 3/2021 | Choi | H04W 72/21 |
| 2021/0144715 | A1* | 5/2021 | Gotoh | H04L 1/0004 |
| 2021/0243784 | A1* | 8/2021 | Goto | H04W 72/21 |
| 2021/0298052 | A1* | 9/2021 | Namba | H04L 1/1851 |

OTHER PUBLICATIONS

Nokia, Nokia Shanghai Bell, "Summary of Friday offline discussion on potential enhancements for PUSCH for NR URLLC (AI 7.2.6.1.3)", R1-1903797, 3GPP TSG-RAN WG1 Meeting #96, Athens, Greece, Feb. 25-Mar. 1, 2019, all pages.
International Search Report from PCT/CN2020/082050, dated Jul. 3, 2020, with English translation from WIPO, all pages.
Written Opinion of the International Searching Authority from PCT/CN2020/082050, dated Jul. 3, 2020, with English translation from WIPO, all pages.
International Preliminary Report on Patentability from PCT/CN2020/082050, dated Sep. 28, 2021, with English translation from WIPO, all pages.
Extended European Search Report for European Application EP20783667.7 issued on May 11, 2022.
3GPP TSG RAN WG1 #96, Athens, Greece, Feb. 25-Mar. 1, 2019, R1-1902443, ETRI "Potential Enhancements to PUSCH," entire document.

* cited by examiner

INFORMATION TRANSMISSION METHOD AND USER EQUIPMENT

CROSS-REFERENCE TO RELATED APPLICATIONS

This application is the U.S. national phase of PCT Application No.PCT/CN2020/082050 filed on Mar. 30, 2020, which claims priorities of the Chinese patent application No.201910263377.9 filed in China on Apr. 2, 2019, the Chinese patent application No.201910267628.0 filed in China on Apr. 3, 2019, and the Chinese patent application No.201911083619.2 filed in China on Nov. 7, 2019, the disclosures of which are incorporated herein by reference in their entireties.

TECHNICAL FIELD

The present disclosure relates to the field of communications technology, in particular to an information transmission method and a User Equipment (UE).

BACKGROUND

Along with the change in the demands on mobile communications services, a new wireless communications system (i.e., $5^{th}$-Generation New Radio Access Technology (RAT) (5G NR)) has been studied. In the 5G NR system, one important demand lies in low latency and high reliable communications, so such transmission schemes as Ultra Reliable & Low Latency Communications (URLLC) have been proposed.

In a URLLC uplink transmission scheme, in order to reduce the time delay, a grant-free scheme is adopted, and in order to improve the reliability, it is necessary to ensure sufficient resources.

In a Frequency Division Duplexing (FDD) system, when the transmission of a Physical Uplink Shared Channel (PUSCH) occupying L symbols needs to span a slot boundary, it is necessary to divide the PUSCH into two or more PUSCHs for the transmission, and determine positions of Orthogonal Frequency Division Multiplexing (OFDM) symbols to be occupied by each PUSCH.

In a Time Division Duplexing (TDD) system, the slot boundary and an uplink/downlink switching interval are processed. When the transmission of a PUSCH occupying L symbols needs to span the slot boundary or the uplink/downlink switching interval, it is necessary to divide the PUSCH into two or more PUSCHs for the transmission, and determine positions of OFDM symbols to be occupied by each PUSCH transmission.

With respect to one Transport Block (TB), when it is divided into a plurality of PUSCHs for the transmission in the form of repeated/segmented transmissions, it is necessary to configure a Redundancy Version (RV) for each repetition/segment. The selection of the RV needs to take decoding performance and self-decoding performance into consideration. Usually, system bits in codes have a greater impact on the decoding performance and the self-decoding performance, and check bits in the codes have a smaller impact on the decoding performance and the self-decoding performance. However, better decoding performance is provided in the case of an appropriate proportion of the quantity of system bits to the quantity of check bits.

In the related URLLC, the following technical scheme has been proposed with respect to the configuration of the RV. According to the standard, the RV is configured through Radio Resource Control (RRC). For example, the quantity K of repeated transmissions is 4, RV is {0 2 3 1}, and a time-domain resource position is {a starting OFDM symbol, the quantity of OFDM symbols}. The time-domain resource position is defined as a Transmission Opportunity (TO), i.e., a resource position for one repeated transmission, and K=4 means that four TOs are required for four repeated transmissions. When data is transmitted on a first TO, RV=0 is adopted; when data is transmitted on a second TO, RV=2 is adopted; when data is transmitted on a third TO, RV=3 is adopted; and when data is transmitted on a fourth TO, RV=1 is adopted.

In FIG. 1, when the transmission of a PUSCH having a length of L needs to span the slot boundary or the uplink/downlink switching interval, the transmission is divided into two transmissions. When N symbols are occupied before the slot boundary or the uplink/downlink switching interval, L-N symbols are occupied after the slot boundary or the uplink/downlink switching interval, where N or L-N is not limited. When the repeated/segmented transmissions have different lengths, there is no scheme about how to configure the RV for each repetition/segment.

SUMMARY

An object of the present disclosure is to provide an information transmission method and a UE, so as to determine an RV corresponding to each repetition/segment in accordance with a length of each repetition/segment (the quantity of symbols occupied thereby) when the quantities of symbols occupied by the repetitions/segments of a PUSCH are different, thereby to improve the data transmission reliability.

In order to solve the above-mentioned problem, the present disclosure provides the following technical solutions.

In one aspect, the present disclosure provides in some embodiments an information transmission method, including: obtaining configuration information for transmitting a Physical Uplink Shared Channel (PUSCH); obtaining respective Redundancy Versions (RVs) corresponding to at least two repeated/segmented transmissions of the PUSCH in accordance with lengths of the repeated/segmented transmissions of the PUSCH and the configuration information when the PUSCH is transmitted in the form of the repeated/segmented transmissions; and transmitting the PUSCH in accordance with the RVs.

In a possible embodiment of the present disclosure, the obtaining the respective RVs corresponding to the at least two repeated/segmented transmissions of the PUSCH in accordance with the lengths of the repeated/segmented transmissions of the PUSCH and the configuration information when the PUSCH is transmitted in the form of the repeated/segmented transmissions comprises: obtaining the lengths of the repeated/segmented transmissions of the PUSCH in accordance with time-domain resource information of the PUSCH as well as a slot boundary or an uplink/downlink switching time; dividing the PUSCH into N repetitions/segments in accordance with the lengths of the repeated/segmented transmissions of the PUSCH, N being an integer greater than or equal to 2; and obtaining the respective RVs corresponding to the at least two repeated/segmented transmissions of the PUSCH in accordance with the RV configuration information.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, and enabling an $(i+1)^{th}$ repetition/segment to an $N^{th}$ repetition/segment to correspond to a second RV to an $M^{th}$ RV in the RV sequence respectively in accordance with an order of the RVs in the RV sequence, where i=2, 3, . . . , N.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, where i=2, 3, . . . , N.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs, ranking the N repetitions/segments of the PUSCH in a descending order of the lengths, and enabling the ranked N repetitions/segments to correspond to the RVs respectively in accordance with an order of the RVs in the RV sequence.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs and N is greater than M, determining a first target RV sequence comprising L*M RVs, L RV sequences being arranged sequentially, ranking the N repetitions/segments of the PUSCH in a descending order of the lengths, and enabling the ranked N repetitions/segments to correspond to the RVs respectively in accordance with an order of the RVs in the first target RV sequence, where L is an integer greater than or equal to 1

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs and N is greater than M, ranking first M repetitions/segments in the N repetitions/segments of the PUSCH in accordance with the lengths, enabling the ranked M repeated/segmented transmissions to correspond to the RVs respectively in accordance with an order of the RVs in the RV sequence, and enabling an $(M+1)^{th}$ to an $N^{th}$ repetitions/segments of the PUSCH to correspond to the RVs respectively in an order of the RVs corresponding to the first M repetitions/segments.

In a possible embodiment of the present disclosure, when two repetitions/segments of the PUSCH have a same length, the two repetitions/segments of the PUSCH are ranked in a chronological order.

In a possible embodiment of the present disclosure, a value of the RV corresponding to the repetition/segment after the slot boundary or the uplink/downlink switching time is determined in accordance with a value of the RV corresponding to the repetition/segment before the slot boundary or the uplink/downlink switching time.

In a possible embodiment of the present disclosure, when RVs corresponding to two repetitions/segments before and after the slot boundary or the uplink/downlink switching time have a same value, the two repetitions/segments before and after the slot boundary or the uplink/downlink switching time are outputted through selecting encoding bits corresponding to the RVs respectively in accordance with the RVs corresponding to the two repetitions/segments, or outputted through selecting encoding bits corresponding to the RVs sequentially in accordance with lengths of the two repetitions/segments before and after the slot boundary or the uplink/downlink switching time.

In another aspect, the present disclosure provides in some embodiments a UE, including a processor, a memory storing therein a program executed by the processor, and a transceiver. The transceiver is configured to obtain respective RVs corresponding to at least two repeated/segmented transmissions of the PUSCH in accordance with lengths of the repeated/segmented transmissions of the PUSCH and the configuration information when the PUSCH is transmitted in the form of the repeated/segmented transmissions. The transceiver is further configured to transmit the PUSCH in accordance with the RVs.

In a possible embodiment of the present disclosure, the processor is specifically configured to: obtain the lengths of the repeated/segmented transmissions of the PUSCH in accordance with time-domain resource information of the PUSCH as well as a slot boundary or an uplink/downlink switching time; divide the PUSCH into N repetitions/segments in accordance with the lengths of the repeated/segmented transmissions of the PUSCH, N being an integer greater than or equal to 2; and obtain the respective RVs corresponding to the at least two repeated/segmented transmissions of the PUSCH in accordance with the lengths of the repeated/segmented transmissions of the PUSCH and the RV configuration information.

In a possible embodiment of the present disclosure, obtaining the respective RVs corresponding to the at least two repeated/segmented transmissions of the PUSCH in accordance with the lengths of the repeated/segmented transmissions of the PUSCH and the RV configuration information, the processor is specifically configured to: when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enable an RV corresponding to the $i^{th}$ repetition/segment to be 0, and enable an $(i+1)^{th}$ repetition/segment to an $N^{th}$ repetition/segment to correspond to a second RV to an $M^{th}$ RV in the RV sequence respectively in accordance with an order of the RVs in the RV sequence, where i=2, 3, . . . , N; or when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enable an RV corresponding to the $i^{th}$ repetition/segment to be 0, where i=2, 3, . . . , N; or when an RV sequence in the RV configuration information comprises M RVs, ranking the N repetitions/segments of the PUSCH in a descending order of the lengths, and enable the ranked N repetitions/segments to correspond to the RVs respectively in accordance with an order of the RVs in the RV sequence; or when an RV sequence in the RV configuration information comprises M RVs and N is greater than M, determining a first target RV sequence comprising L*M RVs, L RV sequences being arranged sequentially, ranking the N repetitions/segments of the PUSCH in a descending order of the lengths, and enable the ranked N repetitions/segments to correspond to the RVs respectively in accordance with an order of the RVs in the first target RV sequence, where L is an integer greater than or equal to 1; or when an RV sequence in the RV configuration information comprises M RVs and N is greater than M, ranking first M repetitions/segments in the N repetitions/segments of the PUSCH in accordance with the lengths, enable the ranked M repeated/segmented transmissions to correspond to the RVs respectively in accordance with an order of the RVs in the RV sequence, and enable an $(M+1)^{th}$ to an $N^{th}$ repetitions/segments of the PUSCH to correspond to the RVs respectively in an order of the RVs corresponding to the first M repetitions/segment.

In a possible embodiment of the present disclosure, when two repetitions/segments of the PUSCH have a same length, the two repetitions/segments of the PUSCH are ranked in a chronological order.

In a possible embodiment of the present disclosure, a value of the RV corresponding to the repetition/segment after the slot boundary or the uplink/downlink switching time is determined in accordance with a value of the RV corresponding to the repetition/segment before the slot boundary or the uplink/downlink switching time.

In a possible embodiment of the present disclosure, when RVs corresponding to two repetitions/segments before and after the slot boundary or the uplink/downlink switching time have a same value, the two repetitions/segments before and after the slot boundary or the uplink/downlink switching time are outputted through selecting encoding bits corresponding to the RVs respectively in accordance with the RVs corresponding to the two repetitions/segments, or outputted through selecting encoding bits corresponding to the RVs sequentially in accordance with lengths of the two repetitions/segments before and after the slot boundary or the uplink/downlink switching time.

In yet another aspect, the present disclosure provides in some embodiments a UE, including: a transceiver module configured to obtain configuration information for transmitting a PUSCH; and a processing module configured to obtain respective RVs corresponding to at least two repeated/segmented transmissions of the PUSCH in accordance with lengths of the repeated/segmented transmissions of the PUSCH and the configuration information when the PUSCH is transmitted in the form of the repeated/segmented transmissions. The transceiver module is further configured to transmit the PUSCH in accordance with the RVs.

In still yet another aspect, the present disclosure provides in some embodiments an information transmission method, including: transmitting configuration information for transmitting a PUSCH; obtaining respective RVs corresponding to at least two repeated/segmented transmissions of the PUSCH in accordance with lengths of the repeated/segmented transmissions of the PUSCH and the configuration information when the PUSCH is transmitted in the form of the repeated/segmented transmissions; and receiving the PUSCH in accordance with the RVs.

In a possible embodiment of the present disclosure, the obtaining the respective RVs corresponding to the at least two repeated/segmented transmissions of the PUSCH in accordance with the configuration information when the PUSCH is transmitted in the form of the repeated/segmented transmissions comprises: obtaining the lengths of the repeated/segmented transmissions of the PUSCH in accordance with time-domain resource information of the PUSCH as well as a slot boundary or an uplink/downlink switching time; dividing the PUSCH into N repetitions/segments in accordance with the lengths of the repeated/segmented transmissions of the PUSCH, N being an integer greater than or equal to 2; and obtaining the respective RVs corresponding to the at least two repeated/segmented transmissions of the PUSCH in accordance with the lengths of the repeated/segmented transmissions of the PUSCH and the RV configuration information.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, and enabling an $(i+1)^{th}$ repetition/segment to an $N^{th}$ repetition/segment to correspond to a second RV to an $M^{th}$ RV in the RV sequence respectively in accordance with an order of the RVs in the RV sequence, where i=2, 3, . . . , N.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, where i=2, 3, . . . , N.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs, ranking the N repetitions/segments of the PUSCH in a descending order of the lengths, and enabling the ranked N repetitions/segments to correspond to the RVs respectively in accordance with an order of the RVs in the RV sequence.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs and N is greater than M, determining a first target RV sequence comprising L*M RVs, L RV sequences being arranged sequentially, ranking the N repetitions/segments of the PUSCH in a descending order of the lengths, and enabling the ranked N repetitions/segments to correspond to the RVs respectively in accordance with an order of the RVs in the first target RV sequence, where L is an integer greater than or equal to 1.

In a possible embodiment of the present disclosure, the obtaining the respective RVs corresponding to the at least two repeated/segmented transmissions of the PUSCH in accordance with the lengths of the repeated/segmented transmissions of the PUSCH and the RV configuration information comprises: when an RV sequence in the RV configuration information comprises M RVs and N is greater than M, ranking first M repetitions/segments in the N repetitions/segments of the PUSCH in accordance with the lengths, enabling the ranked M repeated/segmented transmissions to correspond to the RVs respectively in accordance with an order of the RVs in the RV sequence, and enabling an $(M+1)^{th}$ to an $N^{th}$ repetitions/segments of the PUSCH to correspond to the RVs respectively in an order of the RVs corresponding to the first M repetitions/segments.

In a possible embodiment of the present disclosure, when two repetitions/segments of the PUSCH have a same length, the two repetitions/segments of the PUSCH are ranked in a chronological order.

In a possible embodiment of the present disclosure, a value of the RV corresponding to the repetition/segment after the slot boundary or the uplink/downlink switching time is determined in accordance with a value of the RV corresponding to the repetition/segment before the slot boundary or the uplink/downlink switching time.

In a possible embodiment of the present disclosure, when RVs corresponding to two repetitions/segments before and after the slot boundary or the uplink/downlink switching time have a same value, the two repetitions/segments are inputted into a decoder in accordance with the RVs, or the two repetitions/segments before and after the slot boundary or the uplink/downlink switching time are cascaded and inputted into the decoder.

In still yet another aspect, the present disclosure provides in some embodiments a network device, including a processor, a memory storing therein a program executed by the processor, and a transceiver. The transceiver is configured to transmit configuration information for transmitting a PUSCH. The processor is configured to execute the program to obtain respective RVs corresponding to at least two repeated/segmented transmissions of the PUSCH in accordance with lengths of the repeated/segmented transmissions of the PUSCH and the configuration information when the PUSCH is transmitted in the form of the repeated/segmented transmissions. The transceiver is further configured to receive the PUSCH in accordance with the RVs.

In a possible embodiment of the present disclosure, the processor is specifically configured to: obtain the lengths of the repeated/segmented transmissions of the PUSCH in accordance with time-domain resource information of the PUSCH as well as a slot boundary or an uplink/downlink switching time; divide the PUSCH into N repetitions/segments in accordance with the lengths of the repeated/segmented transmissions of the PUSCH, N being an integer greater than or equal to 2; and obtain the respective RVs corresponding to the at least two repeated/segmented transmissions of the PUSCH in accordance with the lengths of the repeated/segmented transmissions of the PUSCH and the RV configuration information.

In a possible embodiment of the present disclosure, when obtaining the respective RVs corresponding to the at least two repeated/segmented transmissions of the PUSCH in accordance with the lengths of the repeated/segmented transmissions of the PUSCH and the RV configuration information, the processor is specifically configured to: when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enable an RV corresponding to the $i^{th}$ repetition/segment to be 0, and enable an $(i+1)^{th}$ repetition/segment to an $N^{th}$ repetition/segment to correspond to a second RV to an $M^{th}$ RV in the RV sequence respectively in accordance with an order of the RVs in the RV sequence, where i=2, 3, . . . , N; or when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enable an RV corresponding to the $i^{th}$ repetition/segment to be 0, where i=2, 3, . . . , N; or when an RV sequence in the RV configuration information comprises M RVs, ranking the N repetitions/segments of the PUSCH in a descending order of the lengths, and enable the ranked N repetitions/segments to correspond to the RVs respectively in accordance with an order of the RVs in the RV sequence; or when an RV sequence in the RV configuration information comprises M RVs and N is greater than M, determining a first target RV sequence comprising L*M RVs, L RV sequences being arranged sequentially, ranking the N repetitions/segments of the PUSCH in a descending order of the lengths, and enable the ranked N repetitions/segments to correspond to the RVs respectively in accordance with an order of the RVs in the first target RV sequence, where L is an integer greater than or equal to 1; or when an RV sequence in the RV configuration information comprises M RVs and N is greater than M, ranking first M repetitions/segments in the N repetitions/segments of the PUSCH in accordance with the lengths, enable the ranked M repeated/segmented transmissions to correspond to the RVs respectively in accordance with an order of the RVs in the RV sequence, and enable an $(M+1)^{th}$ to an $N^{th}$ repetitions/segments of the PUSCH to correspond to the RVs respectively in an order of the RVs corresponding to the first M repetitions/segments.

In a possible embodiment of the present disclosure, when two repetitions/segments of the PUSCH have a same length, the two repetitions/segments of the PUSCH are ranked in a chronological order.

In a possible embodiment of the present disclosure, a value of the RV corresponding to the repetition/segment after the slot boundary or the uplink/downlink switching time is determined in accordance with a value of the RV corresponding to the repetition/segment before the slot boundary or the uplink/downlink switching time.

In a possible embodiment of the present disclosure, when RVs corresponding to two repetitions/segments before and after the slot boundary or the uplink/downlink switching time have a same value, the two repetitions/segments are inputted into a decoder in accordance with the RVs, or the two repetitions/segments before and after the slot boundary or the uplink/downlink switching time are cascaded and inputted into the decoder.

In still yet another aspect, the present disclosure provides in some embodiments a network device, including: a transceiver module configured to transmit configuration information for transmitting a PUSCH; and a processing module configured to obtain respective RVs corresponding to at least two repeated/segmented transmissions of the PUSCH in accordance with lengths of the repeated/segmented transmissions of the PUSCH and the configuration information when the PUSCH is transmitted in the form of the repeated/segmented transmissions. The transceiver module is further configured to receive the PUSCH in accordance with the RVs.

In still yet another aspect, the present disclosure provides in some embodiments a computer-readable storage medium including an instruction. The instruction is executed by a computer to implement the above-mentioned information transmission methods.

The present disclosure has the following beneficial effects.

According to the embodiments of the present disclosure, the configuration information for transmitting a PUSCH is obtained, the RV corresponding to each of at least two repeated/segmented transmissions is obtained in accordance with the lengths of the repeated/segmented transmissions of the PUSCH and the configuration information when the PUSCH is transmitted in the form of repeated/segmented transmissions, and then the PUSCH is transmitted in accordance with the RV. As a result, it is able to determine the RV corresponding to each repeated/segmented transmission in accordance with the lengths of the repetitions/segments (the quantity of symbols, e.g., OFDM symbols, occupied by the repetitions/segments) when the quantities of symbols occupied by the repetitions/segments of the PUSCH are different, thereby to improve the data transmission reliability.

DETAILED DESCRIPTION

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Figure 1:
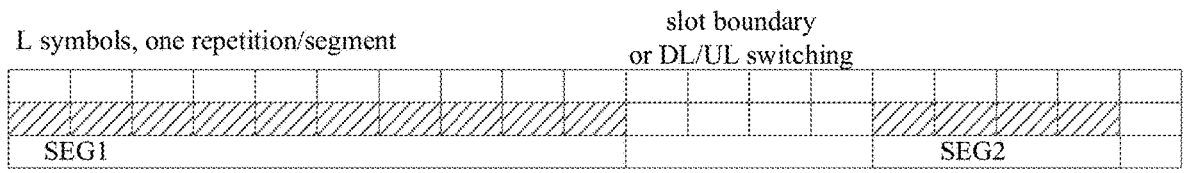
FIG. 1 is a schematic view showing segments of a PUSCH.
Figure 2:
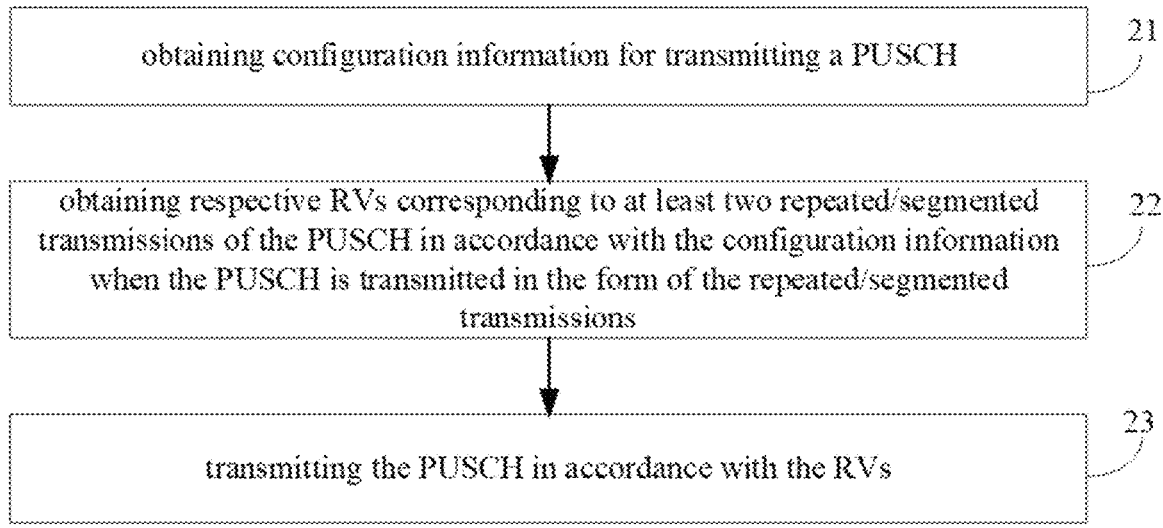
FIG. 2 is a flow chart of an information transmission method according to an embodiment of the present disclosure.

As shown in FIG. 2, the present disclosure provides in some embodiments an information transmission method for a UE, which includes the following steps.

Step 21: obtaining configuration information for transmitting a PUSCH. The configuration information at least includes time-domain resource information and RV configuration information for transmitting the PUSCH. It should be noted that, it may further include the other information, e.g., Demodulation Reference Signal (DMRS) configuration information. To be specific, when obtaining the configuration information, at least one of Downlink Control Information (DCI) signaling, Radio Resource Control (RRC) signaling and a Physical Downlink Control Channel (PDCCH) is received from a network device. The configuration information for transmitting the PUSCH is obtained from at least one of the DCI signaling, the RRC signaling and the PDCCH.

Step 22: obtaining respective RVs corresponding to at least two repeated/segmented transmissions of the PUSCH in accordance with lengths of the repeated/segmented transmissions of the PUSCH and the configuration information when the PUSCH is transmitted in the form of the repeated/segmented transmissions.

Step 23: transmitting the PUSCH in accordance with the RVs.

According to the embodiments of the present disclosure, when the PUSCH is transmitted in the form of repeated/segmented transmissions, the RV corresponding to each of at least two repeated/segmented transmissions of the PUSCH is obtained in accordance with the obtained configuration information, and then the PUSCH is transmitted in accordance with the RV. As a result, it is able to improve the data transmission reliability.

In a possible embodiment of the present disclosure, Step 22 specifically includes the following steps.

Step 221: obtaining the lengths of the repeated/segmented transmissions of the PUSCH in accordance with the time-domain resource information of the PUSCH as well as a slot boundary or an uplink/downlink switching time.

Figure 3:
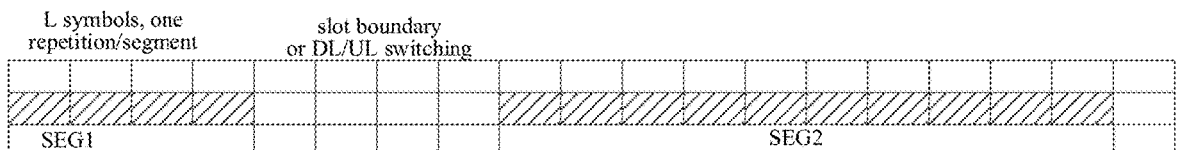
FIG. 3 is a schematic view showing segments of a PUSCH according to an embodiment of the present disclosure.

As shown in FIG. 3, the UE determines a position of the slot boundary or TDD Uplink/Downlink (UL/DL) switching, and determines whether the PUSCH is transmitted once or multiple times as well as the lengths of the repeated/segmented transmissions in accordance with a time-domain resource to be occupied by the PUSCH and the position of the slot boundary or TDD uplink/downlink switching. Here, the lengths of the repeated/segmented transmissions are determined in accordance with the quantity of symbols, e.g., OFDM symbols, occupied by each repeated/segmented transmission.

Step 222: dividing the PUSCH into N repetitions/segments in accordance with the lengths of the repeated/segmented transmissions of the PUSCH, N being an integer greater than or equal to 2.

Step 223: obtaining the respective RVs corresponding to the at least two repeated/segmented transmissions of the PUSCH in accordance with the lengths of the repeated/segmented transmissions of the PUSCH and the RV configuration information.

To be specific, as one implementation mode, Step 223 includes Step 2231 of, when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enabling an RV corresponding to the $i^{th}$ repetition/segment to be 0, and enabling an $(i+1)^{t}$ repetition/segment to an $N^{th}$ repetition/segment to correspond to a second RV to an $M^{th}$ RV in the RV sequence in accordance with an order of the RVs in the RV sequence, where i=(2, 3, . . . , N). Here, all the repetitions/segments of the PUSCH are judged through this method, so as to enable the repetitions/segments to correspond to the RVs respectively.

For example, a gNB (a network device, e.g., a base station) notifies the UE of a resource configuration, a DMRS configuration and an RV configuration through the RRC signaling and/or through activating the PDCCH, so that the UE starts to transmit the PUSCH. It is presumed that the RV sequence in the RV configuration information is {0 2 3 1}.

Due to the slot boundary or TDD uplink/downlink switching, it is necessary to divide one PUSCH transmission into four (or multiple) PUSCH transmissions or four PUSCH segments, and the four repetitions or four PUSCH segments include seg1, seg2, seg3 and seg4. Here, the description is given when N is equal to M. When N is not equal to M, the method is also applicable.

The PUSCH transmission or PUSCH segment before the slot boundary or TDD uplink/downlink switching time is seg1, and the PUSCH transmissions or PUSCH segments after the slot boundary or TDD uplink/downlink switching time are seg2, seg3 and seg4.

Based on the method in the embodiments of the present disclosure, an RV corresponding to seg1 is 0. When a length of seg2 is greater than a length of seg1, an RV corresponding to seg2 is 0, and RVs corresponding to seg3 and seg4 are 2 and 3 respectively. In other words, when the length of seg2 is greater than a previous PUSCH repetition/segment corresponding to RV=0, the RV corresponding to seg2 is 0, i.e., a first RV in the RV sequence. The RVs corresponding to seg3 and seg4 are reset sequentially in accordance with an order of the RVs in the RV sequence, i.e., the RVs corresponding to seg3 and seg4 are 2 and 3 respectively.

Then, a length of seg3 is compared with the length of seg2. When the length of seg3 is greater than the length of seg2, the RV corresponding to seg3 is set as 0, and the RV corresponding to seg4 is set as 2. When the length of seg3 is smaller than the length of seg2, the RV corresponding to seg3 is maintained as 2.

As another implementation mode, Step 223 includes Step 2232 of, when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enabling an RV corresponding to the $i^{th}$ repetition/segment to be 0, where i=(2, 3, . . . , N). Here, all the repetitions/segments of the PUSCH are judged through this method, so as to enable the repetitions/segments to correspond to the RVs respectively.

For example, the gNB notifies the UE of a resource configuration, a DMRS configuration and an RV configuration through the RRC signaling and/or through activating the PDCCH, so that the UE starts to transmit the PUSCH. It is presumed that the RV sequence in the RV configuration information is {0 2 3 1}.

Due to the slot boundary or TDD uplink/downlink switching, it is necessary to divide one PUSCH transmission into four (or multiple) PUSCH transmissions or four PUSCH segments, and the four repetitions or four PUSCH segments include seg1, seg2, seg3 and seg4. Here, the description is given when N is equal to M. When N is not equal to M, the method is also applicable.

The PUSCH repetition or PUSCH segment before the slot boundary or TDD uplink/downlink switching time is seg1, and the PUSCH repetitions or PUSCH segments after the slot boundary or TDD uplink/downlink switching time are seg2, seg3 and seg4.

Based on the method in the embodiments of the present disclosure, an RV corresponding to seg1 is 0. When a length of seg2 is greater than a length of seg1, an RV corresponding to seg2 is 0, and RVs corresponding to seg3 and seg4 remain unchanged, i.e., an RV corresponding to seg3 is 3 and an RV corresponding to seg4 is 1.

When a length of seg3 is greater than the length of seg2, the RV corresponding to seg3 is set as 0; otherwise, the RV corresponding to seg3 is maintained.

As yet another implementation mode, Step 223 includes Step 2233 of, when an RV sequence in the RV configuration information includes M RVs, ranking the N repetitions/segments of the PUSCH in a descending order of the lengths, and enabling the ranked N repetitions/segments to correspond to the RVs respectively in accordance with an order of the RVs in the RV sequence.

For example, the gNB notifies the UE of a resource configuration, a DMRS configuration and an RV configuration through the RRC signaling and/or through activating the PDCCH, so that the UE starts to transmit the PUSCH. It is presumed that the RV sequence in the RV configuration information is {0 2 3 1}.

Due to the slot boundary or TDD uplink/downlink switching, it is necessary to divide one PUSCH transmission into four (or multiple) PUSCH transmissions or four PUSCH segments, and the four repetitions or four PUSCH segments include seg1, seg2, seg3 and seg4. Here, the description is given when N is equal to M. When N is not equal to M, the method is also applicable.

The PUSCH repetition or PUSCH segment before the slot boundary or TDD uplink/downlink switching time is seg1, and the PUSCH repetitions or PUSCH segments after the slot boundary or TDD uplink/downlink switching time are seg2, seg3 and seg4.

Based on the method in the embodiments of the present disclosure, all the segments are ranked in a descending order of the lengths, so as to determine that seg2>seg1>seg4>seg3. When determining the RVs corresponding to the ranked repetitions/segments, the RVs corresponding to seg1, seg2, seg3 and seg3 are 2, 0, 1 and 3 respectively.

As still yet another implementation mode, Step 223 includes Step 2234 of, when an RV sequence in the RV configuration information includes M RVs and N is greater than M, determining a first target RV sequence including L*M RVs, L RV sequences being arranged sequentially, ranking the N repetitions/segments of the PUSCH in a descending order of the lengths, and enabling the ranked N repetitions/segments to correspond to the RVs respectively in accordance with an order of the RVs in the first target RV sequence, where L is an integer greater than or equal to 1.

For example, the gNB notifies the UE of a resource configuration, a DMRS configuration and an RV configuration through the RRC signaling and/or through activating the PDCCH, so that the UE starts to transmit the PUSCH. It is presumed that the RV sequence in the RV configuration information is {0 2 3 1}.

Due to the slot boundary or TDD uplink/downlink switching, it is necessary to divide one PUSCH transmission into four (or multiple) PUSCH transmissions or four PUSCH segments, and the four repetitions or four PUSCH segments include seg1, seg2, seg3 and seg4.

One PUSCH transmission is divided into eight PUSCH transmissions or PUSCH segments, i.e., seg1-8. All the segments are ranked in a descending order of the lengths, so as to determine that seg2>seg1>seg5>seg6>seg4>seg3>seg8>seg7. When determining the RVs corresponding to the ranked repetitions/segments, a corresponding RV sequence is formed through cascading a plurality of RV sequences notified through signaling, i.e., {0 2 3 1 0 2 3 1}. Hence, RVs corresponding to seg2, seg1, seg5, seg6, seg4, seg3, seg8 and seg7 are 0, 2, 3, 1, 0, 2, 3, 1 respectively.

As still yet another implementation mode, Step 223 includes Step 2235 of, when an RV sequence in the RV configuration information includes M RVs and N is greater than M, ranking first M repetitions/segments in the N repetitions/segments of the PUSCH in accordance with the lengths, enabling the ranked M repeated/segmented transmissions to correspond to the RVs respectively in accordance with an order of the RVs in the RV sequence, and enabling an $(M+1)^{th}$ to an $N^{th}$ repetitions/segments of the PUSCH to correspond to the RVs respectively in an order of the RVs corresponding to the first M repetitions/segments.

For example, the gNB notifies the UE of a resource configuration, a DMRS configuration and an RV configuration through the RRC signaling and/or through activating the PDCCH, so that the UE starts to transmit the PUSCH. It is presumed that the RV sequence in the RV configuration information is {0 2 3 1}.

One PUSCH transmission is divided into eight PUSCH transmissions or PUSCH segments, i.e., seg1-8. All the segments are ranked in a descending order of the lengths, so as to determine that seg2>seg1>seg4>seg3. When determining the RVs corresponding to the ranked repetitions/segments, RVs corresponding to seg1, seg2, seg3 and seg4 are 2, 0, 1 and 3 respectively, and RVs corresponding to seg5, seg6, seg7 and seg8 are 2, 0, 1 and 3 respectively too. Here, seg5, seg6, seg7 and seg8 are not ranked in accordance with the lengths any more.

In the embodiments of the present disclosure, when two repetitions/segments of the PUSCH have a same length, the two repetitions/segments of the PUSCH are ranked in a chronological order.

In the embodiments of the present disclosure, a value of the RV corresponding to the repetition/segment after the slot boundary or the uplink/downlink switching time is determined in accordance with a value of the RV corresponding to the repetition/segment before the slot boundary or the uplink/downlink switching time. For example, values of RVs corresponding to two repetitions/segments before and after the slot boundary or uplink/downlink switching time are the same or different from each other. As shown in FIG. 3, values of RVs corresponding to two repetitions/segments (seg1 and seg2) before and after the slot boundary or uplink/downlink switching time are the same or different from each other.

Correspondingly, when RVs corresponding to two repetitions/segments before and after the slot boundary or the uplink/downlink switching time have a same value, the two repetitions/segments before and after the slot boundary or the uplink/downlink switching time are outputted through selecting encoding bits corresponding to the RVs respectively in accordance with the corresponding RVs, or outputted through selecting encoding bits corresponding to the RVs sequentially in accordance with lengths of the two repetitions/segments before and after the slot boundary or the uplink/downlink switching time.

For example, when the RVs corresponding to seg1 and seg2 in FIG. 3 are both 2, seg1 and seg2 are outputted through selecting encoding bits in accordance with RV=2. When selecting the encoding bits, seg1 occupies 4 symbols (i.e., has a length of 4) and seg2 occupies 10 symbols (i.e., has a length of 10). Presumed that every 10 encoding bits occupy 1 symbol (one or more RBs in a frequency domain), when the value of the RV is 2, 140 encoding bits are selected. First 40 bits (e.g., bits 0 to 39) in the 140 encoding bits are selected for seg1, and first 100 bits (e.g., bits 0 to 99) in the 140 encoding bits are selected for seg2. At a base station side, after seg1 has been received, a base station performs a decoding operation in accordance with RV=2, and after seg2 has been received by the base station, the base station performs another decoding operation in accordance with RV=2. In addition, after seg2 has been received by the base station, the base station also performs a soft combining operation on seg2 and seg1 in accordance with RV=2, and then performs a decoding operation.

For another example, when the RVs corresponding to seg1 and seg2 in FIG. 3 are both 2, seg1 and seg2 are outputted through selecting encoding bits in accordance with RV=2. When selecting the encoding bits, seg1 occupies 4 symbols (i.e., has a length of 4) and seg2 occupies 10 symbols (i.e., has a length of 10). Presumed that every 10 encoding bits occupy 1 symbol (one or more RBs in a frequency domain), when the value of the RV is 2, 140 encoding bits are selected. First 40 bits (e.g., bits 0 to 39) in the 140 encoding bits are selected for seg1, and last 100 bits (e.g., bits 40 to 139) in the 140 encoding bits are selected for seg2. At the base station side, after seg1 and seg2 have been received by the base station, they are cascaded to obtain a new repetition/segment segN, and then the base station performs a decoding operation in accordance with RV=2.

In the case that the RVs corresponding to the repetitions/segments of the PUSCH are determined in a chronological order or in accordance with the lengths of the repetitions/segments of the PUSCH, when there is a plurality of PUSCH repetitions/segments corresponding to RV=0 and it is allowed by a system to start the transmission of the PUSCH from any PUSCH repetition/segment corresponding to RV=0, a first repetition/segment of the PUSCH transmission is determined in accordance with a first condition and a second condition, or in accordance with the first condition and a third condition. The first condition refers to that the RV corresponding to the repetition/segment is 0, the second condition refers to that the repetition/segment is not located after the slot boundary or uplink/downlink switching time when the repetition/segment belongs to repetitions/segments obtained through division, and the third condition refers to that the repetition/segment does not belong to repetitions/segments obtained through division.

For yet another example, when the RVs corresponding to seg1 (a PUSCH-repetition) and seg2 (a PUSCH-repetition) in FIG. 3 are both 0, seg1 and seg2 are outputted through selecting encoding bits in accordance with RV=0. When selecting the encoding bits, seg1 occupies 4 symbols (i.e., has a length of 4) and seg2 occupies 10 symbols (i.e., has a length of 10). Presumed that 10 encoding bits occupy 1 symbol (one or more RBs in a frequency domain), when the value of the RV is 0, 140 encoding bits are selected. First 40 bits (e.g., bits 0 to 39) in the 140 encoding bits are selected for seg1, and last 100 bits (e.g., bits 40 to 139) in the 140 encoding bits are selected for seg2. At the base station side, after seg1 and seg2 have been received, they are cascaded to obtain a new repetition/segment segN, and then the base station performs a decoding operation in accordance with RV=0.

When determining whether seg1 or seg1 is a first repetition/segment to be transmitted in the two repeated/segmented transmissions of the PUSCH, whether two conditions has been met needs to be determined. A first one of the two conditions refers to that the RV corresponding to the repeated/segmented transmission is 0. At this time, the RVs corresponding to seg1 and seg2 are both 0, i.e., the first condition has been met. A second one of the two conditions refers to that the repetition/segment is not located after the slot boundary or uplink/downlink switching time when the repeated/segmented transmission belongs to repeated/segmented transmissions obtained through division. Here, seg2 rather than seg1 is a repeated/segmented transmission obtained through division after the slot boundary or uplink/downlink switching time, so seg1 rather than seg2 is taken as the first repetition/segment to be transmitted. When the second condition refers to that the repeated/segmented transmission does not belong the repeated/segmented transmissions obtained through division, neither seg1 nor seg2 is taken as the first repetition/segment to be transmitted. Here, when the first repetition/segment is transmitted, it means that the entire PUSCH starts to be transmitted.

When inter-PUSCH-repetition frequency hopping is started, a same frequency-domain resource is adopted by two repetitions/segments before and after the slot boundary or uplink/downlink switching time, i.e., no frequency hopping occur between the two repeated/segmented transmissions.

According to the embodiments of the present disclosure, when the PUSCH is transmitted in the form of repeated/segmented transmissions, the RV corresponding to each of at least two repeated/segmented transmissions of the PUSCH is obtained in accordance with the obtained configuration information, and then the PUSCH is transmitted in accordance with the RV. As a result, it is able to improve the data transmission reliability.

Figure 4:
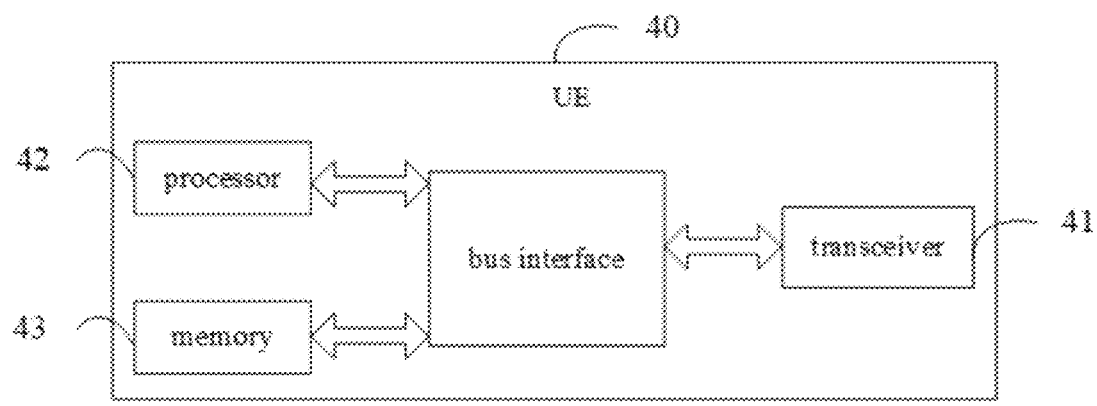
FIG. 4 is a schematic view showing architecture of a UE according to an embodiment of the present disclosure.

As shown in FIG. 4, the present disclosure provides in some embodiments a UE 40, which includes a transceiver 41, a processor 42, and a memory 43 storing therein a program executed by the processor 42. The transceiver 41 is configured to obtain configuration information for transmitting a PUSCH. The processor 42 is configured to execute the program, so as to obtain respective RVs corresponding to at least two repeated/segmented transmissions in accordance with a lengths of the repeated/segmented transmissions of the PUSCH and the configuration information when the PUSCH is transmitted in the form of repeated/segmented transmissions. The transceiver 41 is further configured to transmit the PUSCH in accordance with the RVs.

When obtaining the configuration information for transmitting the PUSCH, the transceiver 41 is specifically configured to receive at least one of DCI signaling, RRC signaling and a PDCCH from a network device, and obtain the configuration information for transmitting the PUSCH from at least one of the DCI signaling, the RRC signaling and the PDCCH.

The configuration information at least includes time-domain resource information and RV configuration information for transmitting the PUSCH.

The processor 42 is specifically configured to: obtain the lengths of the repeated/segmented transmissions of the PUSCH in accordance with time-domain resource information of the PUSCH as well as a slot boundary or an uplink/downlink switching time; divide the PUSCH into N repetitions/segments in accordance with the lengths of the repeated/segmented transmissions of the PUSCH, N being an integer greater than or equal to 2; and obtain the RV corresponding to each of at least two repeated/segmented transmissions in accordance with the lengths of the repeated/segmented transmissions of the PUSCH and the RV configuration information.

When obtaining the respective RVs corresponding to the at least two repeated/segmented transmissions in accordance with the RV configuration information, the processor is specifically configured to: when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enable an RV corresponding to the $i^{th}$ repetition/segment to be 0, and enable an $(i+1)^{th}$ repetition/segment to an $N^{th}$ repetition/segment to correspond to a second RV to an $M^{th}$ RV in the RV sequence in accordance with an order of the RVs in the RV sequence, where i=2, 3, . . . , N; or when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enable an RV corresponding to the $i^{th}$ repetition/segment to be 0, where i=2, 3, . . . , N; or when an RV sequence in the RV configuration information includes M RVs, rank the N repetitions/segments of the PUSCH in a descending order of the lengths, and enable the ranked N repetitions/segments to correspond to the RVs respectively in accordance with an order of the RVs in the RV sequence; or when an RV sequence in the RV configuration information includes M RVs and N is greater than M, determine a first target RV sequence including L*M RVs, L RV sequences being arranged sequentially, rank the N repetitions/segments of the PUSCH in a descending order of the lengths, and enable the ranked N repetitions/segments to correspond to the RVs respectively in accordance with an order of the RVs in the first target RV sequence, where L is an integer greater than or equal to 1; or when an RV sequence in the RV configuration information includes M RVs and N is greater than M, rank first M repetitions/segments in the N repetitions/segments of the PUSCH in accordance with the lengths, enable the ranked M repeated/segmented transmissions to correspond to the RVs respectively in accordance with an order of the RVs in the RV sequence, and enable an $(M+1)^{th}$ to an $N^{th}$ repetitions/segments of the PUSCH to correspond to the RVs respectively in an order of the RVs corresponding to the first M repetitions/segments.

When two repetitions/segments of the PUSCH have a same length, the two repetitions/segments of the PUSCH are ranked in a chronological order.

A value of an RV corresponding to the repeated/segmented transmission after the slot boundary or the uplink/downlink switching time is determined in accordance with a value of an RV corresponding to the repeated/segmented transmission before the slot boundary or the uplink/downlink switching time.

When RVs corresponding to two repetitions/segments before and after the slot boundary or the uplink/downlink switching time have a same value, the two repetitions/segments before and after the slot boundary or the uplink/downlink switching time are outputted through selecting encoding bits corresponding to the RVs respectively in accordance with the corresponding RVs, or outputted through selecting encoding bits corresponding to the RVs sequentially in accordance with lengths of the two repetitions/segments before and after the slot boundary or the uplink/downlink switching time.

When inter-PUSCH-repetition frequency hopping is started, a same frequency-domain resource is adopted by two repetitions/segments before and after the slot boundary or uplink/downlink switching time, i.e., no frequency hopping occur between the two repetitions/segments.

All the embodiments involving the method in FIG. 2 are applicable to the UE with a same technical effect. The transceiver 41 is coupled to the processor 42 and the memory 43 through a bus interface. A function of the transceiver 41 may also achieved by the processor 42, and a function of the processor 42 may also achieved by the transceiver 41.

The present disclosure further provides in some embodiments a UE, which includes: a transceiver module configured to obtain configuration information for transmitting a PUSCH; and a processing module configured to obtain respective RVs corresponding to at least two repeated/segmented transmissions in accordance with a lengths of the repeated/segmented transmissions of the PUSCH and the configuration information when the PUSCH is transmitted in the form of repeated/segmented transmissions. The transceiver module is further configured to transmit the PUSCH in accordance with the RVs.

All the embodiments involving the method in FIG. 2 are applicable to the UE with a same technical effect.

The present disclosure further provides in some embodiments an information transmission method, which includes: Step 51 of transmitting configuration information for transmitting a PUSCH; Step 52 of obtaining respective RVs corresponding to at least two repeated/segmented transmissions in accordance with a lengths of the repeated/segmented transmissions of the PUSCH and the configuration information when the PUSCH is transmitted in the form of repeated/segmented transmissions; and Step 53 of receiving the PUSCH in accordance with the RVs.

Step 52 specifically includes: Step 521 of obtaining the lengths of the repeated/segmented transmissions of the PUSCH in accordance with time-domain resource information of the PUSCH as well as a slot boundary or an uplink/downlink switching time; Step 522 of dividing the PUSCH into N repetitions/segments in accordance with the lengths of the repeated/segmented transmissions of the PUSCH, N being an integer greater than or equal to 2; and Step 523 of obtaining the RV corresponding to each of at least two repeated/segmented transmissions in accordance with the lengths of the repeated/segmented transmissions of the PUSCH and the RV configuration information.

Step 523 includes at least one of the following steps.

Step 5231: when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enabling an RV corresponding to the $i^{th}$ repetition/segment to be 0, and enabling an $(i+1)^{th}$ repetition/segment to an $N^{th}$ repetition/segment to correspond to a second RV to an $M^{th}$ RV in the RV sequence in accordance with an order of the RVs in the RV sequence, where i=2, 3, . . . , N.

Step 5232: when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enabling an RV corresponding to the $i^{th}$ repetition/segment to be 0, where i=2, 3, . . . , N.

Step 5233: when an RV sequence in the RV configuration information includes M RVs, ranking the N repetitions/segments of the PUSCH in a descending order of the lengths, and enabling the ranked N repetitions/segments to correspond to the RVs respectively in accordance with an order of the RVs in the RV sequence.

Step 5234: when an RV sequence in the RV configuration information includes M RVs and N is greater than M, determining a first target RV sequence including L*M RVs, L RV sequences being arranged sequentially, ranking the N repetitions/segments of the PUSCH in a descending order of the lengths, and enabling the ranked N repetitions/segments to correspond to the RVs respectively in accordance with an order of the RVs in the first target RV sequence, where L is an integer greater than or equal to 1.

Step 5235: when an RV sequence in the RV configuration information includes M RVs and N is greater than M, ranking first M repetitions/segments in the N repetitions/segments of the PUSCH in accordance with the lengths, enabling the ranked M repeated/segmented transmissions to correspond to the RVs respectively in accordance with an order of the RVs in the RV sequence, and enabling an $(M+1)^{th}$ to an $N^{th}$ repetitions/segments of the PUSCH to correspond to the RVs respectively in an order of the RVs corresponding to the first M repetitions/segments.

When two repetitions/segments of the PUSCH have a same length, the two repetitions/segments of the PUSCH are ranked in a chronological order.

A value of an RV corresponding to repetition/segment after the slot boundary or the uplink/downlink switching time is determined in accordance with a value of an RV corresponding to the repetition/segment before the slot boundary or the uplink/downlink switching time.

When RVs corresponding to two repetitions/segments before and after the slot boundary or the uplink/downlink switching time have a same value, the two repetitions/segments are inputted into a decoder in accordance with the RVs, or the two repetitions/segments before and after the slot boundary or the uplink/downlink switching time are cascaded and inputted into the decoder.

The method in the embodiments of the present disclosure is applied to a network device, e.g., a base station. The determining the RV corresponding to each repeated/segmented transmission of the PUSCH in the method is the same as that in the embodiments involving the method in FIG. 2, and all the embodiments involving the method in FIG. 2 are applicable to the method for the network device, with a same technical effect.

The present disclosure further provides in some embodiments a network device, which includes a transceiver, a processor, and a memory storing therein a program executed by the processor. The transceiver is configured to transmit configuration information for transmitting a PUSCH. The processor is configured to execute the program, so as to obtain respective RVs corresponding to at least two repeated/segmented transmissions in accordance with a lengths of the repeated/segmented transmissions of the PUSCH and the configuration information when the PUSCH is transmitted in the form of repeated/segmented transmissions. The transceiver is further configured to receive the PUSCH in accordance with the RVs.

The processor is specifically configured to: obtain the lengths of the repeated/segmented transmissions of the PUSCH in accordance with time-domain resource information of the PUSCH as well as a slot boundary or an uplink/downlink switching time; divide the PUSCH into N repetitions/segments in accordance with the lengths of the repeated/segmented transmissions of the PUSCH, N being an integer greater than or equal to 2; and obtain the RV corresponding to each of at least two repeated/segmented transmissions in accordance with the lengths of the repeated/segmented transmissions of the PUSCH and the RV configuration information.

When obtaining the respective RVs corresponding to the at least two repeated/segmented transmissions in accordance with the lengths of the repeated/segmented transmissions of the PUSCH and the RV configuration information, the processor is specifically configured to: when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enable an RV corresponding to the $i^{th}$ repetition/segment to be 0, and enable an $(i+1)^{th}$ repetition/ segment to an $N^{th}$ repetition/segment to correspond to a second RV to an $M^{th}$ RV in the RV sequence in accordance with an order of the RVs in the RV sequence, where i=2, 3, . . . , N; or when an RV sequence in the RV configuration information includes M RVs, an RV corresponding to a first repetition/segment of the PUSCH is 0 and a length of an $i^{th}$ repetition/segment is greater than a length of a previous repetition/segment corresponding to RV=0, enable an RV corresponding to the $i^{th}$ repetition/segment to be 0, where i=2, 3, . . . , N; or when an RV sequence in the RV configuration information includes M RVs, rank the N repetitions/segments of the PUSCH in a descending order of the lengths, and enable the ranked N repetitions/segments to correspond to the RVs respectively in accordance with an order of the RVs in the RV sequence; or when an RV sequence in the RV configuration information includes M RVs and N is greater than M, determine a first target RV sequence including L*M RVs, L RV sequences being arranged sequentially, rank the N repetitions/segments of the PUSCH in a descending order of the lengths, and enable the ranked N repetitions/segments to correspond to the RVs respectively in accordance with an order of the RVs in the first target RV sequence, where L is an integer greater than or equal to 1; or when an RV sequence in the RV configuration information includes M RVs and N is greater than M, rank first M repetitions/segments in the N repetitions/segments of the PUSCH in accordance with the lengths, enable the ranked M repeated/segmented transmissions to correspond to the RVs respectively in accordance with an order of the RVs in the RV sequence, and enable an $(M+1)^{th}$ to an $N^{th}$ repetitions/segments of the PUSCH to correspond to the RVs respectively in an order of the RVs corresponding to the first M repetitions/segments.

When two repetitions/segments of the PUSCH have a same length, the two repetitions/segments of the PUSCH are ranked in a chronological order.

A value of an RV corresponding to the repeated/segmented transmission after the slot boundary or the uplink/downlink switching time is determined in accordance with a value of an RV corresponding to the repeated/segmented transmission before the slot boundary or the uplink/downlink switching time.

When RVs corresponding to two repetitions/segments before and after the slot boundary or the uplink/downlink switching time have a same value, the two repetitions/segments are inputted into a decoder in accordance with the RVs, or the two repetitions/segments before and after the slot boundary or the uplink/downlink switching time are cascaded and inputted into the decoder.

The present disclosure further provides in some embodiments a network device, which includes: a transceiver module configured to transmit configuration information for transmitting a PUSCH; and a processing module configured to obtain respective RVs corresponding to at least two repeated/segmented transmissions in accordance with a lengths of the repeated/segmented transmissions of the PUSCH and the configuration information when the PUSCH is transmitted in the form of repeated/segmented transmissions. The transceiver module is further configured to receive the PUSCH in accordance with the RVs.

It should be appreciated that, all the embodiments involving the method for the network side are applicable to the network device, with a same technical effect.

The present disclosure further provides in some embodiments a computer-readable storage medium including an instruction. The instruction is executed by a computer so as to implement the method for the UE or the network device.

All the implementation modes in the embodiments involving the methods are applicable to the computer-readable storage medium, with a same technical effect.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

It should be further appreciated that, the device and method are implemented in any other ways. For example, the embodiments for the apparatus is merely for illustrative purposes, and the modules or units are provided merely on the basis of their logic functions. During the actual application, some modules or units are combined together or integrated into another system. Alternatively, some functions of the module or units are omitted or not executed. In addition, the coupling connection, direct coupling connection or communication connection between the modules or units is implemented via interfaces, and the indirect coupling connection or communication connection between the modules or units is implemented in an electrical or mechanical form or in any other form.

The units are, or are not, physically separated from each other. The units for displaying are, or are not, physical units, i.e., they are arranged at an identical position, or distributed on a plurality of network elements. Parts or all of the units are selected in accordance with the practical need, so as to achieve the purpose of the present disclosure.

In addition, the functional units in the embodiments of the present disclosure are integrated into a processing unit, or the functional units exist independently, or two or more functional units are combined together.

In the case that the functional units are implemented in a software form and sold or used as a separate product, they are stored in a computer-readable medium. Based on this, the technical solutions of the present disclosure, partial or full, or parts of the technical solutions of the present disclosure contributing to the prior art, appear in the form of software products, which are stored in a storage medium and include instructions so as to enable a computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings may be performed or not performed in a chronological order. It should be noted that, some steps are also performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure are also implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium is any known storage medium or a storage medium that occurs in future. It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings may be performed or not performed in a chronological order. It should be noted that, some steps are also performed in parallel, or independently of each other.

It should be appreciated that, the embodiments of the present disclosure are implemented by hardware, software, firmware, middleware, microcode or a combination thereof. For the hardware implementation, the module, the unit, the sub-module, or the sub-unit may be implemented in one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and executed by the processor. The memory is implemented inside or outside the processor.

Hence, the purposes of the present disclosure are also implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium is any known storage medium or a storage medium that occurs in future. It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings may be performed or not performed in a chronological order. It should be noted that, some steps are also performed in parallel, or independently of each other.

The above are optional implementations of the present disclosure. It should be pointed out that for those of ordinary skill in the art, improvements and modifications can be made without departing from the principles described in the present disclosure, and these improvements and modifications are also within the protection scope of the present disclosure.

What is claimed is:

1. An information transmission method, comprising:
   obtaining configuration information for transmitting a Physical Uplink Shared Channel (PUSCH);
   obtaining respective Redundancy Versions (RVs) corresponding to at least two repeated/segmented transmissions of the PUSCH in accordance with lengths of the repeated/segmented transmissions of the PUSCH and the configuration information when the PUSCH is transmitted in the form of the repeated/segmented transmissions; and
   transmitting the PUSCH in accordance with the RVs,
   wherein the obtaining the respective RVs corresponding to the at least two repeated/segmented transmissions of the PUSCH in accordance with the configuration information when the PUSCH is transmitted in the form of the repeated/segmented transmissions comprises:
   obtaining the lengths of the repeated/segmented transmissions of the PUSCH in accordance with time-domain resource information of the PUSCH and an uplink/downlink switching time;
   dividing the PUSCH into N repetitions/segments in accordance with the lengths of the repeated/segmented transmissions of the PUSCH, N being an integer greater than or equal to 2; and
   obtaining the respective RVs corresponding to the at least two repeated/segmented transmissions of the PUSCH in accordance with the lengths of the repeated/segmented transmissions of the PUSCH and RV configuration information;
   wherein the obtaining the respective RVs corresponding to the at least two repeated/segmented transmissions of the PUSCH in accordance with the lengths of the repeated/segmented transmissions of the PUSCH and the RV configuration information comprises:
   when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, and enabling an $(i+1)^{th}$ repetition/segment to an $N^{th}$ repetition/segment to correspond to a second RV to an $M^{th}$ RV in the RV sequence respectively in accordance with an order of the RVs in the RV sequence, where i=2, 3, . . . , N;
   or,
   wherein the obtaining the respective RVs corresponding to the at least two repeated/segmented transmissions of the PUSCH in accordance with the lengths of the repeated/segmented transmissions of the PUSCH and the RV configuration information comprises:
   when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, where i=2, 3, . . . , N;
   or,
   wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs, ranking the N repetitions/segments of the PUSCH in a descending order of the lengths, and enabling the ranked N repetitions/segments to correspond to the RVs respectively in accordance with an order of the RVs in the RV sequence;

or, wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs and N is greater than M, determining a first target RV sequence comprising L*M RVs, L RV sequences being arranged sequentially, ranking the N repetitions/segments of the PUSCH in a descending order of the lengths, and enabling the ranked N repetitions/segments to correspond to the RVs respectively in accordance with an order of the RVs in the first target RV sequence, where L is an integer greater than or equal to 1;

or, wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs and N is greater than M, ranking first M repetitions/segments in the N repetitions/segments of the PUSCH in accordance with the lengths, enabling the ranked M repeated/segmented transmissions to correspond to the RVs respectively in accordance with an order of the RVs in the RV sequence, and enabling an $(M+1)^{th}$ to an $N^{th}$ repetitions/segments of the PUSCH to correspond to the RVs respectively in an order of the RVs corresponding to the first M repetitions/segments.

2. The information transmission method according to claim 1, wherein when two repetitions/segments of the PUSCH have a same length, the two repetitions/segments of the PUSCH are ranked in a chronological order.

3. The information transmission method according to claim 1, wherein a value of the RV corresponding to the repetition/segment after the slot boundary or the uplink/downlink switching time is determined in accordance with a value of the RV corresponding to the repetition/segment before the slot boundary or the uplink/downlink switching time.

4. The information transmission method according to claim 3, wherein when RVs corresponding to two repetitions/segments before and after the slot boundary or the uplink/downlink switching time have a same value, the two repetitions/segments before and after the slot boundary or the uplink/downlink switching time are outputted through selecting encoding bits corresponding to the RVs respectively in accordance with the RVs corresponding to the two repetitions/segments, or outputted through selecting encoding bits corresponding to the RVs sequentially in accordance with lengths of the two repetitions/segments before and after the slot boundary or the uplink/downlink switching time.

5. A User Equipment (UE), comprising a processor, and a memory storing therein a program executed by the processor, and a transceiver, wherein the transceiver is configured to obtain configuration information for transmitting a Physical Uplink Shared Channel (PUSCH);

the processor is configured to execute the program to obtain respective Redundancy Versions (RVs) corresponding to at least two repeated/segmented transmissions of the PUSCH in accordance with lengths of the repeated/segmented transmissions of the PUSCH and the configuration information when the PUSCH is transmitted in the form of the repeated/segmented transmissions; and the transceiver is further configured to transmit the PUSCH in accordance with the RVs, wherein the processor is specifically configured to:

obtain the lengths of the repeated/segmented transmissions of the PUSCH in accordance with time-domain resource information of the PUSCH and an uplink/downlink switching time;

divide the PUSCH into N repetitions/segments in accordance with the lengths of the repeated/segmented transmissions of the PUSCH, N being an integer greater than or equal to 2; and obtain the respective RVs corresponding to the at least two repeated/segmented transmissions of the PUSCH in accordance with the lengths of the repeated/segmented transmissions of the PUSCH and RV configuration information;

wherein when obtaining the respective RVs corresponding to the at least two repeated/segmented transmissions of the PUSCH in accordance with the lengths of the repeated/segmented transmissions of the PUSCH and the RV configuration information, the processor is specifically configured to:

when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enable an RV corresponding to the $i^{th}$ repetition/segment to be 0, and enable an $(i+1)^{th}$ repetition/segment to an $N^{th}$ repetition/segment to correspond to a second RV to an $M^{th}$ RV in the RV sequence respectively in accordance with an order of the RVs in the RV sequence, where i=2, 3, ..., N;

or, when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enable an RV corresponding to the $i^{th}$ repetition/segment to be 0, where i=2, 3, ..., N;

or, when an RV sequence in the RV configuration information comprises M RVs, rank the N repetitions/segments of the PUSCH in a descending order of the lengths, and enable the ranked N repetitions/segments to correspond to the RVs respectively in accordance with an order of the RVs in the RV sequence;

or, when an RV sequence in the RV configuration information comprises M RVs and N is greater than M, determine a first target RV sequence comprising L*M RVs, L RV sequences being arranged sequentially, rank the N repetitions/segments of the PUSCH in a descending order of the lengths, and enable the ranked N repetitions/segments to correspond to the RVs respectively in accordance with an order of the RVs in the first target RV sequence, where L is an integer greater than or equal to 1;

or, when an RV sequence in the RV configuration information comprises M RVs and N is greater than M, rank first M repetitions/segments in the N repetitions/segments of the PUSCH in accordance with the lengths, enable the ranked M repeated/segmented transmissions to correspond to the RVs respectively in accordance with an order of the RVs in the RV sequence, and enable an $(M+1)^{th}$ to an $N^{th}$ repetitions/segments of the PUSCH to correspond to the RVs respectively in an order of the RVs corresponding to the first M repetitions/segments.

6. An information transmission method, comprising:

transmitting configuration information for transmitting a Physical Uplink Shared Channel (PUSCH);

obtaining respective Redundancy Versions (RVs) corresponding to at least two repeated/segmented transmissions of the PUSCH in accordance with lengths of the repeated/segmented transmissions of the PUSCH and the configuration information when the PUSCH is transmitted in the form of the repeated/segmented transmissions; and receiving the PUSCH in accordance with the RVs, wherein the obtaining the respective RVs corresponding to the at least two repeated/segmented transmissions of the PUSCH in accordance with the configuration information when the PUSCH is transmitted in the form of the repeated/segmented transmissions comprises:

obtaining the lengths of the repeated/segmented transmissions of the PUSCH in accordance with time-domain resource information of the PUSCH and an uplink/downlink switching time;

dividing the PUSCH into N repetitions/segments in accordance with the lengths of the repeated/segmented transmissions of the PUSCH, N being an integer greater than or equal to 2; and obtaining the respective RVs corresponding to the at least two repeated/segmented transmissions of the PUSCH in accordance with the lengths of the repeated/segmented transmissions of the PUSCH and RV configuration information;

wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, and enabling an $(i+1)^{th}$ repetition/segment to an $N^{th}$ repetition/segment to correspond to a second RV to an $M^{th}$ RV in the RV sequence respectively in accordance with an order of the RVs in the RV sequence, where i-2, 3, . . . , N;

or, wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs, an RV corresponding to a first repetition/segment of the PUSCH is 0, and a length of an $i^{th}$ repetition/segment is greater than a length of a previous repetition/segment corresponding to RV=0, enabling an RV corresponding to the $i^{th}$ repetition/segment to be 0, where i=2, 3, . . . , N;

or, wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs, ranking the N repetitions/segments of the PUSCH in a descending order of the lengths, and enabling the ranked N repetitions/segments to correspond to the RVs respectively in accordance with an order of the RVs in the RV sequence;

or, wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs and N is greater than M, determining a first target RV sequence comprising L*M RVs, L RV sequences being arranged sequentially, ranking the N repetitions/segments of the PUSCH in a descending order of the lengths, and enabling the ranked N repetitions/segments to correspond to the RVs respectively in accordance with an order of the RVs in the first target RV sequence, where L is an integer greater than or equal to 1;

or, wherein the obtaining the respective RVs corresponding to the at least two repeated/segmented transmissions of the PUSCH in accordance with the lengths of the repeated/segmented transmissions of the PUSCH and the RV configuration information comprises:

when an RV sequence in the RV configuration information comprises M RVs and N is greater than M, ranking first M repetitions/segments in the N repetitions/segments of the PUSCH in accordance with the lengths, enabling the ranked M repeated/segmented transmissions to correspond to the RVs respectively in accordance with an order of the RVs in the RV sequence, and enabling an $(M+1)^{th}$ to an $N^{th}$ repetitions/segments of the PUSCH to correspond to the RVs respectively in an order of the RVs corresponding to the first M repetitions/segments.

7. The information transmission method according to claim 6, wherein when two repetitions/segments of the PUSCH have a same length, the two repetitions/segments of the PUSCH are ranked in a chronological order.

8. A network device, comprising a processor, a memory storing therein a program executed by the processor, and a transceiver, wherein the processor is configured to execute the program to implement the information transmission method according to claim 6.

* * * * *